United States Patent [19]

Spieth

[11] Patent Number: 4,754,330
[45] Date of Patent: Jun. 28, 1988

[54] DISPLAY DEFLECTION CONTROL LOOP

[75] Inventor: Robert H. Spieth, Ronkonkoma, N.Y.

[73] Assignee: Hazeltine Corporation, Greenlawn, N.Y.

[21] Appl. No.: 77,969

[22] Filed: Jul. 22, 1987

Related U.S. Application Data

[63] Continuation of Ser. No. 719,190, Apr. 3, 1985, abandoned.

[51] Int. Cl.$^4$ .............................................. H04N 5/04
[52] U.S. Cl. .................................. 358/158; 358/148
[58] Field of Search ............... 358/148, 150, 158, 159; 331/20; 315/387, 389

[56] References Cited

U.S. PATENT DOCUMENTS

| | | | |
|---|---|---|---|
| 3,821,470 | 6/1974 | Merrell | 358/159 |
| 3,891,800 | 6/1975 | Janssen et al. | 358/159 |
| 4,228,463 | 10/1980 | Steckler et al. | 358/158 |
| 4,253,117 | 2/1981 | Kadlec | 358/158 |
| 4,317,133 | 2/1982 | Fernsler | 358/158 |
| 4,396,948 | 8/1983 | Fernsler | 331/20 |
| 4,467,359 | 8/1984 | Hosoya | 358/158 |

FOREIGN PATENT DOCUMENTS 2056823  3/1981  United Kingdom ................ 331/20

Primary Examiner—Michael A. Masinick
Attorney, Agent, or Firm—E. A. Onders

[57] ABSTRACT

A system for synchronizing a succession of horizontal deflection coil currents of a CRT display with a succession of synchronization signals includes a variable delay which is strobed by a synchronization signal and triggers the generation of a deflection current after a specified delay. The delay is automatically controlled by a feedback loop in which the present delay is measured by a set-reset flip-flop, the flip-flop providing an output pulse having a duration equal to the delay. An integrator averages a train of output pulses from the flip-flop, and combines a reference signal with the average value to provide the control signal for the delay. The system operates with minimal bandwidth and with dynamics which are free of acquisition constraints so as to provide minimal sensitivity to noise.

9 Claims, 2 Drawing Sheets

DISPLAY DEFLECTION CONTROL LOOP

This is a continuation of application Ser. No. 719,190, filed Apr. 3, 1985 and now abandoned.

BACKGROUND OF THE INVENTION

This invention relates to deflection control in CRT (cathode ray tube) displays and, more paricularly, to a locked loop control based on a comparison of a yoke current signal directly with a horizontal synchronization signal.

CRT displays, such as those employed in television, present pictures which are developed by a raster scan wherein a frame of the raster comprises a set of horizontal lines. Successive sets of horizontal lines are separated by a vertical retrace. In order to insure that lines are generated at the desired instants of time in each frame, thereby to place the lines in registration with each other for good picture quality, some form of synchronization is employed.

In the typical construction of a CRT, the tube is provided with deflection coils, sometimes referred to as a yoke, which are driven by currents to deflect the beam to a desired point on the face of the display. One of these coils, the horizontal deflection coil, deflects the beam in the horizontal direction for generating each line. A second of these coils, the vertical deflection coil, adjusts the height of the beam during the scanning of each line.

Of particular interest is the operation of the horizontal deflection coil. During the scanning of each line, an electric current having a waveform in the form of a ramp is applied to the coil. The initiation of each ramp is individually controlled by synchronizing the ramp with a signal referred to as the horizontal sync. In the cases of television and other forms of CRT displays, the sync for each line is transmitted along with the data to be displayed. However, the horizontal sync is not provided between frames during vertical retrace intervals. As a result, synchronization circuitry may fall partially out of lock during a retrace interval unless the circuitry is specifically designed to continue operating during the retrace interval.

A suitable synchronization circuit, extensively employed in display technology, comprises a phase-locked loop. Such a synchronization circuit is capable of operating during the retrace interval without loss of synchronization because the phase-locked loop includes a VCO (Voltage controlled oscillator) which runs continuously. Thereby, the loop maintains proper phase, except for a negligibly small drift, in the absence of the horizontal sync during the retrace interval.

A problem arises in that a phase-locked loop, in combination with a loop filter which controls the dynamic response of the loop, and in combination further with coil driver circuitry which is placed within the loop, has a transfer function which is substantially more complex than the simple integrator which characterizes the VCO. As a result, such loops have a tendency toward instability, and may experience jitter due to noise, which effects may reduce the precision of presentation of data on the display.

It is noted that a display need not be constructed as a television, wherein the number of sync pulses is restricted by the transmitted signal format and bandwidth. In the case of a computer driven display, horizontal sync pulses can be generated continuously, even during the retrace interval in which case there is no need for the synchronization circuit to provide its own phase reference, as by use of the foregoing VCO. Thus, it is seen that presently available synchronization circuitry provides a capacity that may not be required and at the expense of possible instability and excessive sensitivity to noise.

SUMMARY OF THE INVENTION

The foregoing problem is overcome and other advantages are provided by a display deflection synchronization circuit wherein, in accordance with the invention, a succession of pulses resulting from flyback currents in a coil driver circuit is compared directly with a continuously repeating horizontal sync pulse signal for development of a timing signal. The timing signal off sets the initiation of a ramp current drive to the deflection coil to bring the ramp current into synchronization with the sync signal.

In the synchronization circuit of the invention, the timing signal is provided by a monostable multivibrator or "one shot" driven by the sync pulse, and having an electronically adustable delay. The synchronization circuit is constructed in the form of a loop having a comparison circuit for providing the foregoing comparison of the flyback pulse with the sync pulse, the comparison circuit generating a loop error signal in response to the comparison. The comparison circuit includes an integrator which serves as a filter for stabilizing the loop. The loop error signal appears at the output of the integrator, and is applied to the one-shot for adjusting the delay thereof to bring the ramp current into synchronization with the sync signal.

BRIEF DESCRIPTION OF THE DRAWING

The foregoing aspects and other features of the invention are explained in the following description taken in connection with the accompanying drawing wherein.

DETAILED DESCRIPTION

Figure 1:
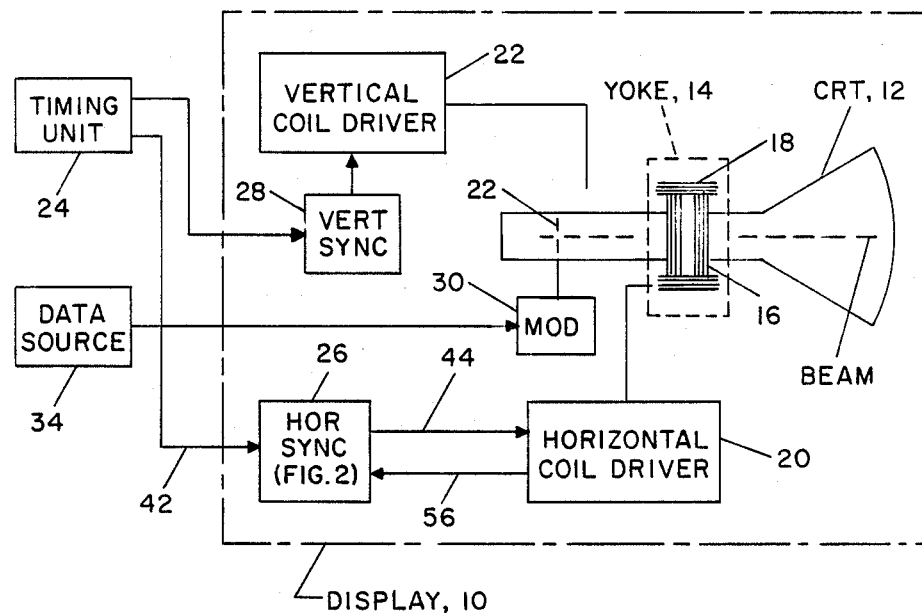
FIG. 1 is a simplified schematic diagram of a display having a CRT.

With reference to FIG. 1, there is shown a display 10 having a CRT 12 wherein an electron beam is deflected by a yoke 14. The yoke 14 includes a horizontal deflection coil 16 and a vertical deflection coil 18 which are driven respectively coil drivers 20 and 22. Each of the drivers 20 and 22 includes well-known circuitry (not shown) for developing the requisite drive currents in the respective coils 16 and 18. A timing unit 24 provides horizontal and vertical synchronization signals to the drivers 20 and 22, respectively, via horizontal and vertical synchronization circuits 26 and 28. The electron beam is modulated with data signals by a modulator 30 connecting with a control grid 32 of the CRT, the data signals being provided by a source 34 of data.

Figure 2:
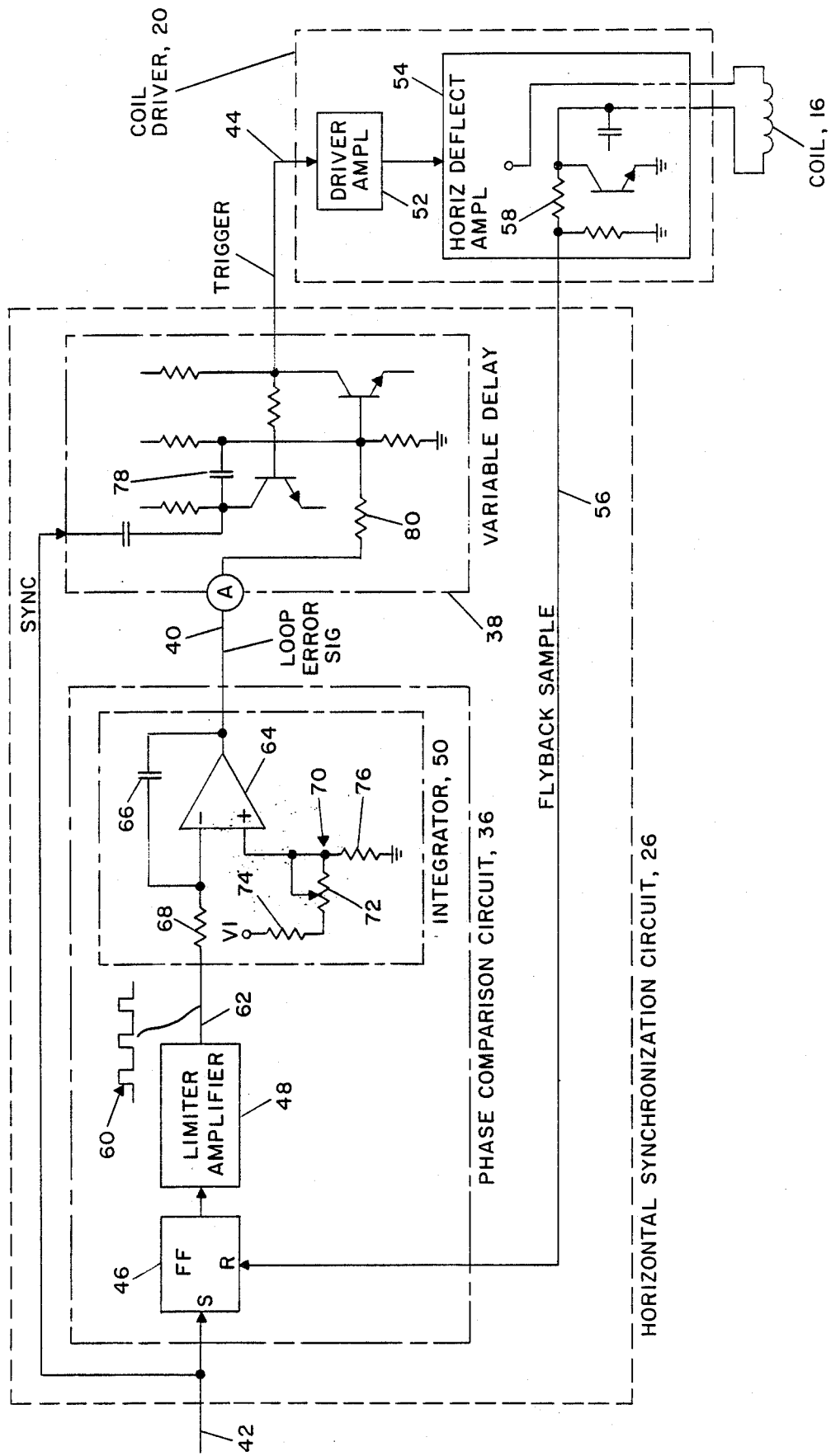
FIG. 2 is a block diagram of a synchronization circuit of the invention for use in the display of FIG. 1.

With reference also to FIG. 2, the horizontal synchronization circuits 26 comprises a comparison circuit 36 and a variable delay unit 38. The delay unit 38 is constructed as a monostable multivibrator, or one shot, and is constructed of a well-known circuit of which a simplified portion is shown schematically within the block of the delay unit 38. The amount of delay imparted by the unit 38 is electronically controllable by a signal applied to terminal A of the delay unit 38. As will now be described hereinafter, such a signal is provided by the comparison circuit 36 on line 40. The synchronization circuit 26 receives a sync pulse signal from the timing unit 24 via line 42, and outputs a trigger signal via line 44 to the horizontal coil driver 20. The comparison circuit 36 comprises a set-rest flip-flop 46, a limiting amplifier 48, and an integrator 50. The sync signal on line 42 strobes the delay unit 38, and is also applied to the set terminal of the flip-flop 46. The coil driver 20 comprises a driver amplifier 52 and a horizontal deflection amplifier 54, the latter being in circuit with the horizontal deflection coil 16.

In accordance with the invention, the circuitry of FIG. 2 operates in the manner of a feedback loop to provide a flyback sample of current in the coil 16 via line 56 to the reset terminal of the flip-flop 46. The deflection amplifier 54 is constructed with a well-known circuit, a portion thereof, being indicated schematically in FIG. 2. The coil current flows through a transistor capacitor being connected to the junction of the coil and the transistor to absorb energy of the flyback current when the transistor is gated off by a signal from the driver amplifier 52 to terminate current in the coil 16 at the conclusion of the scanning of one line. The line 56 is coupled to the foregoing transistor via an attenuator 58 which may be configured as a resistive voltage divider as depicted in FIG. 2. The attenuator 58 reduces the relatively large voltage pulse associated with a flyback current to a relatively small voltage pulse suitable for resetting the flip-flop 46.

The flip-flop 46 develops an output pulse having a duration equal to the time elapsed between the occurrence of the sync pulser on line 42 and the flyback sample on line 56. For each sync pulse 42, there is produced a coil current and its associated flyback sample. Therefore, the output of the flip flop 46 is a pulse train. The output signal of the flip flop 46 is amplified by the amplifier 48, which amplifier has a limiting function producing a precisely defined amplitude to each of the pulses, while retaining their respective pulse widths. An exemplary pulse train 60 is depicted at the output of the amplifier 48 on line 62.

The integrator 50 comprises a differential amplifier 64 having a positive input terminal and a negative input terminal, a capacitor 66 coupled between an output terminal of the amplifier 64 and the negative inut terminal thereof, a resistor 68 connecting line 62 to the negative input terminal of the amplifier 64, and a voltage reference source 70 providing a reference voltage to the positive input terminal of the amplifier 64. The reference source 70 comprises a potentiometer 72 connected between a voltage source V1 and ground by a series circuit of resistors 74 and 76. The magnitude of the voltage reference applied to the amplifier 64 may be adjusted by operation of the potentiometer 72.

Figure 3:
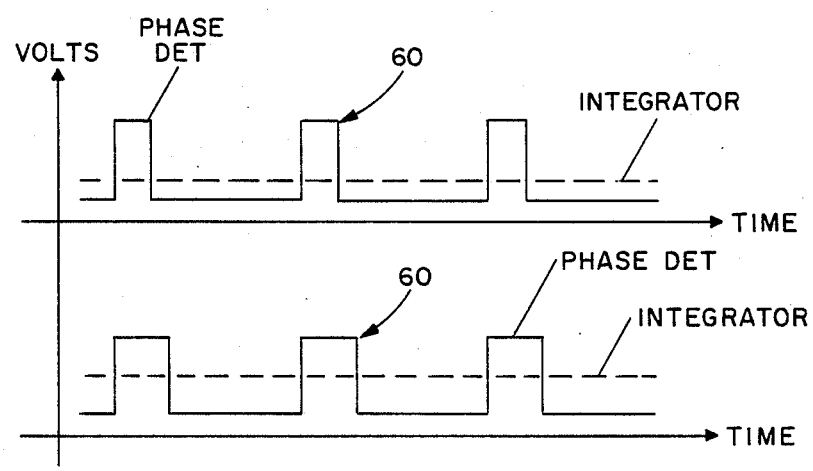
FIG. 3 is a graph showing the operation of an integrator of FIG. 2 for developing a loop error signal.

The cpacitor 66 in combination with the resistor 68 and the amplifier 64 provides an integration function whereby the signal of the pulse train 60 is integrated to become a DC (direct current) level on line 40. This may be further understood with reference to the graphs of FIG. 3 wherein the first graph shows a pulse train 60 of relatively narrow pulses while the second graph shows a pulse train 60 of relatively wide pulses. A dashed line representing the output DC level of the integrator 50 is shown in each of the graphs, the dashed line showing a lower DC level in the first graph and a higher DC level in the second graph. The lower DC level in the first graph results from the relatively narrow pulses, while the higher DC level in the second graph results from the relatively wider pulses.

The operation of the flip-flop 46 in providing an output pulse duration which represents a time delay between the signals on the lines 42 and 56 is analogous to that of a phase detector which detects the temporal relationship, or phase, between two input signals. Herein, the two input signals are the signals on lines 42 and 56, and the pulse width outputted by the flip-flop 46 represents the phase between the two signals on the lines 42 and 56. Accordingly, the signal on line 40 is the average value of such phase. It is further noted that, in view of the differential input to the amplifier 64, the signal on line 40 is the difference between the average phase and the reference signal provided by the synchronization circuit 26. Adjustment of the potentiometer 72 establishes the desired temporal relationship between the sync pulse signal on line 42 and the flyback sample signal on line 56.

The delay unit 38 comprises a capacitor 78 coupled in a feedback path between two transistors of the circuitry of the delay unit 38. The capacitor 78, in cooperation with other resistors connected thereto establishes a charging and discharging time of the capacitor whereby the transistors are forced to revert to their original conduction states after a predetermined elapsed time from the strobing of the circuit by the sync pulse on line 42. This is in accordance with the well known operation of a multivibrator circuit in which the initial strobing changes the states of current flow in the respective transistors and wherein, after the predetermined time delay, the transistors revert to their original current states.

The loop error signal on line 40 is applied by the comparison circuit 36 to the control terminal A of the delay unit 38 for setting a value of delay in accordance with the magnitude of the signal on line 40. The loop error signal is applied via a resistor 80 to the junction of a terminal of the capacitor 78 and a gate circuit of one of the transistors. Thereby, a voltage drop across the capacitor 78 is summed with the loop error signal so as to offset the time when the capacitor 78 attains a suitable voltage drop for triggering the transistor to revert to its original current state. In this way, the loop error signal on line 40 controls the time of occurrence of the trailing edge of the output trigger pulse on line 44 produced by the delay unit 38. The driver amplifier 52 is strobed by the trailing edge of the trigger pulse on line 44. Thereby, the activation of the driver amplifier 52 is delayed from the occurrence of the sync pulse by an amount of time designated by the loop error signal.

Thus, the synchronization circuit 26 in combination with the coil driver 20 functions as a feedback loop which insures that the times of occurrence of a sequence of horizontal line scans is locked to the times of occurrence of a sequence of horizontal synchronization pulse signals. The temporal relationship between the succession of horiziontal lines and the succession of sync pulses can be adjusted by the potentiometer 72. The circuitry of FIG. 2 is free of any acquisition constraints because an output ramp current appears automatically in the coil 16 upon each occurrence of a sync pulse on line 42. The predesignated temporal relationship is established after a succession of horizontal lines have been generated so as to provide time for the loop to pull in and adjust the delay of the unit 38 for the predesignated delay.

The dynamic response of the loop need be fast enough only to pull in the desired delay upon initial power turn-on of the display 10. Since the sync pulses on line 42 are provided at a fixed rate, there are no further dynamic constraints. Accordingly, the capacitor 66 may be made large enough, if desired, to provide a loop bandwidth on the order of a fractional hertz rather than the thousands of hertz required of loops having dynamic acquisition constraints. As a result, the circuitry of FIG. 2 operates in a virtually noise-free environment with respect to the synchronization of the coil current.

It is further noted that no constraints have been placed on the circuitry of the timing unit 24. The synchronization pulses outputted by the timing unit 24 may be provided by a digital clock, or a phase locked loop driven by yet a further reference signal. In the event that there is any drifting in the rate of production of the synchronization pulses by the timing unit 24, then the capacitor 66 of the integrator 50 would be selected to provide a loop bandwidth which is sufficiently large to follow the drifting rate of the timing unit 24. However, it is presumed that sources of synchronization pulses are sufficiently stable so that a loop bandwidth of one hertz or less may be employed. Larger bandwidths may also be employed, in which case the capacitor 66 may be made of smaller size. Such smaller size may be advantageous in the fabrication of miniaturized electronic circuitry.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A display deflection synchronization circuit for synchronizing the occurrence of a succession of display deflection signals with the occurrence of a succession of synchronization signals, the circuit comprising:
   means for detecting a difference in phase between the deflection signals and the synchronization signals, said detecting means providing an output signal indicating a magnitude of said difference;
   means coupled to said detecting means for integrating said output signal to provide an average value thereof;
   deflection means providing said deflection signals; and
   trigger means driven by said synchronization signals for strobing said deflection means to provide said deflection signals, said trigger means consisting of a monostable multivibrator for strobing relative to a synchronization signal, said vibrator being operative in response to said average value provided by said integrating means.

2. A circuit according to claim 1 wherein said integrating means includes means for combining said average value with a reference signal, the resulting average value representing a shift in said phase from a desired value of said phase designated by said reference signal.

3. A circuit according to claim 2 wherein phase detecting means comprises a flip-flop set by said synchronization signals and reset by said deflection signals, the duration of pulses of said output signal being a measure of time delay between synchronization and deflection signals.

4. A circuit according to claim 3 wherein said deflection means includes a coil and a coil driver, said deflection signal being a sample of a current flyback signal.

5. A system for synchronizing a succession of deflection coil currents of a CRT display with a succession of synchronization signals comprising:
   means for generating a signal sample characteristic of a deflection coil current;
   means for measuring delay between each of the succession of deflection signal samples and corresponding signals of said succession of synchronization signals to provide a measure thereof; and
   trigger means coupled to said measuring means and driven by said synchronization signals for triggering the generation of a deflection coil current, said trigger means consisting of a monostable multivibrator for delaying a strobing signal relative to a synchronization signal, said vibrator being operative in response to said measure of delay.

6. A system according to claim 5 wherein said measuring means includes means for integrating said delay measure to provide an average value thereof, said average value of said delay measure being applied to said trigger means.

7. A system according to claim 6 wherein said integrating means includes means for combining said average value with a reference signal, the resulting average value representing a shift in said delay from a desired value of said delay.

8. A system according to claim 7 wherein said measuring means comprises a flip-flop set by said synchronizing signals and reset by said deflection signal samples, the duration of an output signal of said flip-flop constituting said measure of delay.

9. A system according to claim 8 wherein said deflection signal sample is obtained from a flyback of said coil current upon termination of the current at the end of a horizontal line scan.

* * * * *